United States Patent
Grzegorzewski et al.

(10) Patent No.: US 6,786,535 B1
(45) Date of Patent: Sep. 7, 2004

(54) VERTICALLY AND HORIZONTALLY SPLIT MIDGATE ASSEMBLY

(75) Inventors: Bruce M. Grzegorzewski, Warren, MI (US); William Charles Bisnack, Sterling Hts., MI (US); Vincent L. Ruma, Clarkston, MI (US); Richard J. Lange, Troy, MI (US); Andrew J. Novajovsky, Grand Blanc, MI (US); Ajay Mahesh Kharod, Rochester Hills, MI (US); John J. Mascarello, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/443,313

(22) Filed: May 22, 2003

(51) Int. Cl.⁷ .............................................. B62D 33/06
(52) U.S. Cl. .............................. 296/190.11; 296/37.16; 296/37.6; 296/146.16; 296/26.11
(58) Field of Search ............................ 296/37.16, 37.6, 296/190.11, 183, 146.16, 26.1, 26.11, 57.1, 66, 65.16, 69, 146.8

(56) References Cited

U.S. PATENT DOCUMENTS

| | | | |
|---|---|---|---|
| 5,934,727 A | 8/1999 | Storc et al. | 296/26.11 |
| 6,076,880 A * | 6/2000 | Coffer et al. | 296/65.16 |
| 6,260,916 B1 | 7/2001 | Hunt | 296/190.11 |
| 6,276,751 B1 * | 8/2001 | Ikarashi et al. | 296/190.11 |
| 6,341,820 B1 * | 1/2002 | Kimura et al. | 296/65.16 |
| 6,416,104 B1 | 7/2002 | Fisher et al. | 296/37.16 |
| 6,478,355 B1 | 11/2002 | Van Eden et al. | 296/37.6 |
| 6,513,863 B1 | 2/2003 | Renke et al. | 296/190.11 |
| 2002/0070573 A1 * | 6/2002 | Song | 296/37.6 |

* cited by examiner

*Primary Examiner*—D. Glenn Dayoan
*Assistant Examiner*—Jason Morrow
(74) *Attorney, Agent, or Firm*—Laura C. Hargitt

(57) ABSTRACT

A vehicle body has a first compartment for carrying passengers or cargo and a second compartment for carrying cargo rearwardly adjacent the first compartment. The body includes a frame defining an opening between the first and second compartments. The opening includes lower and upper portions. A window is mounted to the frame to close the upper portion of the opening. A closure panel is mounted to the frame and includes first and second hinged panel sections each pivotable between an open position permitting access through first and second portions, respectively, of the lower portion of the opening, and a closed position closing the first and second portions, respectively, of the lower portion of the opening.

22 Claims, 11 Drawing Sheets

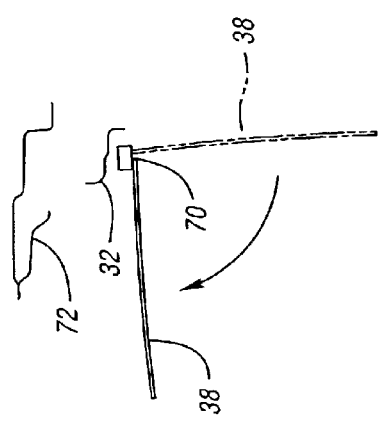
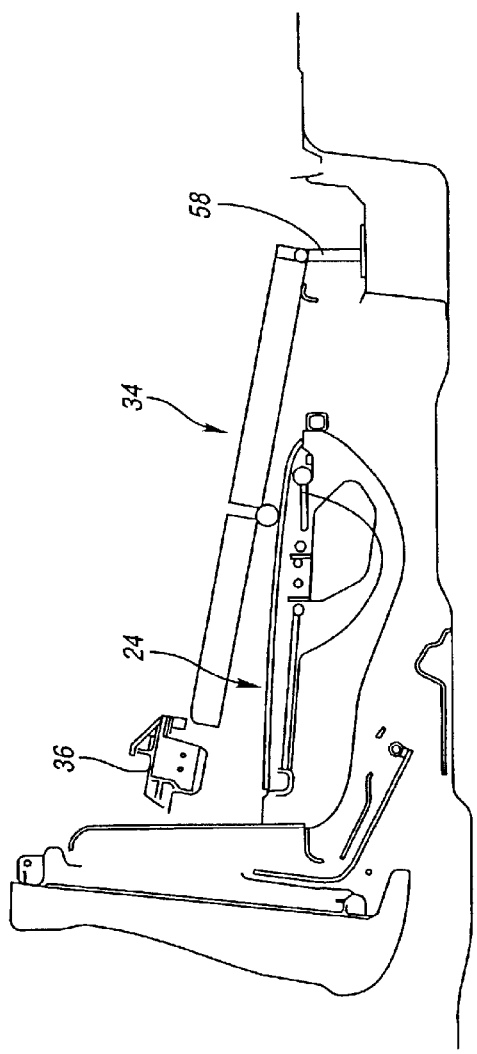
Fig. 6

VERTICALLY AND HORIZONTALLY SPLIT MIDGATE ASSEMBLY

TECHNICAL FIELD

The present invention relates to a vehicle body having a midgate panel with first and second hinged panel sections each pivotable between an open position and a closed position relative to an opening between adjacent cargo compartments.

BACKGROUND OF THE INVENTION

It is known in the art to provide a pickup truck or SUV having a cab portion for carrying passengers with a rear seat section behind the driver and a cargo box behind the cab portion for carrying cargo. It is also known to provide aligned openings in the cab portion and the cargo box for carrying longer loads which extend into the passenger compartment when the rear seat is folded down. Currently, a multi-use vehicle is available which provides a pickup truck having a rear passenger compartment convertible to a cargo area and separated from a rear pickup box by a midgate having a flexible hinged panel and window system. This vehicle is adapted to accommodate a variety of optional configurations for alternatively carrying a maximum passenger load or an extended cargo load under both covered and uncovered conditions in which the cargo load is protected from or exposed to ambient external conditions.

It is desirable to improve functionality of the vehicle.

SUMMARY OF THE INVENTION

The invention provides a closure planel having first and second hinged panel sections which are each pivotable between open and closed positions with respect to an opening between adjacent compartments of a vehicle.

More specifically, a vehicle body includes a first compartment for carrying passengers or cargo and a second compartment for carrying cargo rearwardly adjacent the first compartment. The body includes a frame defining an opening between the first and second compartments. The opening includes upper and lower portions. A window is mounted to the frame to close the upper portion of the opening. A closure panel is mounted to the frame and has first and second hinged panel sections each pivotable between an open position permitting access through first and second portions, respectively, of the lower portion of the opening, and a closed position closing the first and second portions, respectively, of the lower portion of the opening.

In one embodiment, the first and second hinged panel sections are positioned side-by-side adjacent each other with a vertical split therebetween. The first and second hinged panel sections are each pivotally connected to the frame about a horizontal axis at a lower edge of the lower portion of the opening.

In another embodiment, the first hinged panel section is positioned vertically above the second hinged panel section with a horizontal split therebetween. The first hinged panel section is pivotally connected to the second hinged panel section about a first horizontal pivot axis and the second hinged panel section is pivotally connected to the frame about a second horizontal pivot axis.

A crossbar may be mounted in the opening between the upper and lower portions of the opening. The crossbar may be fixed to the frame, or the crossbar may be removably mounted to the frame and pivotable with the closure panel to the open position.

The window may be removable, and the panel sections may be moved to the open position in either a first condition wherein the crossbar remains in the frame supporting the window, or a second condition wherein the window is removed and the crossbar remains attached to and opens with the panel. The closure panel may include a pocket for receiving the window when the window is removed from the upper portion of the opening.

The window may be hinged along an upper edge to the frame for pivotal movement to a horizontal, open position.

A counterbalancing strut may be operatively connected between at least one of the hinged panel sections and a body floor to bias the panel section toward the open and closed positions, alternatively, depending on the pivoted position of the panel section. The counterbalancing strut is preferably a gas strut which is pivotable between a first position biasing the panel section toward the closed position and a second position biasing the panel section toward the open position, with a center position therebetween at which the gas strut is at its most compressed position. The gas strut is at least partially positionable within a floor recess when in the second position.

An electric motor may be operatively connected to at least one of the panel sections for pivoting the panel section between the open and closed positions.

A latch may also be provided for holding the closure panel in the closed position. A control may be provided for allowing unlatching of the latch only when a corresponding vehicle transmission is in a park or neutral position.

These and other features and advantages of the invention will be more fully understood from the following detailed description of the specific embodiments of the invention taken together with the accompanying drawings.

BRIEF DESCRIPTION OF THE DRAWINGS

FIG. 6 shows a cross sectional view of the body of FIG. 5 in an alternative configuration in which the crossbar collapses with the closure panel and the window is hinged to pivot to a horizontal position;

FIG. 10b shows an enlarged schematic view illustrating drive and driven gears and a motor of FIG. 10a;

DESCRIPTION OF THE PREFERRED EMBODIMENTS

Figure 1:
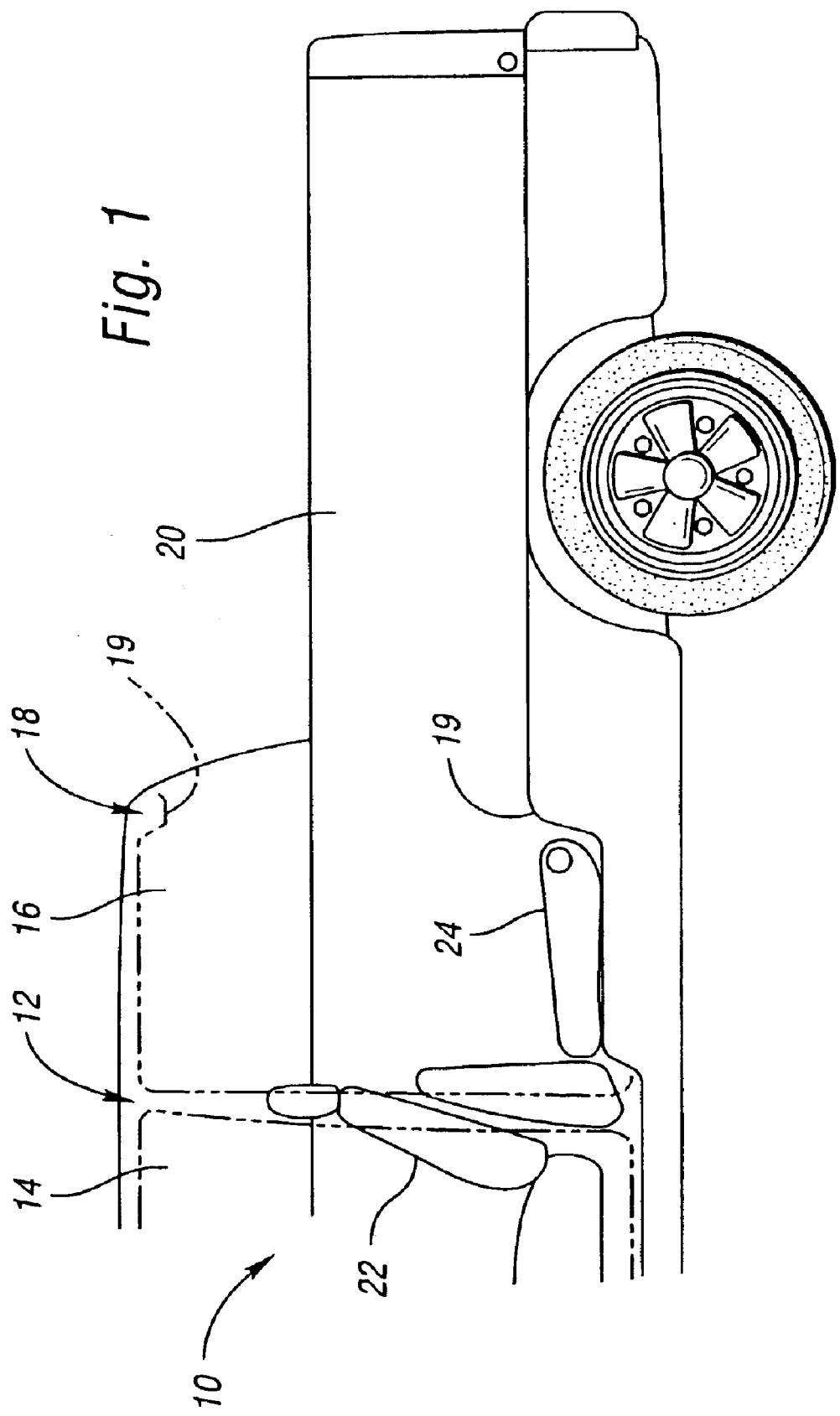
FIG. 1 shows a schematic partial side view of a vehicle having an opening for receiving a midgate in accordance with the invention.

Referring to FIG. 1, numeral 10 generally indicates a pickup truck or SUV of the extended cab type having a body 12 including an internal front compartment 14 connected with an internal rear compartment 16, which is to be separated from an external rear compartment or cargo box 20 by a midgate assembly to be described below. The midgate assembly is positioned within the opening 19 between the compartment 16 and cargo box 20. As shown, seats 22, 24 are positioned in the front and rear compartments 14, 16, respectively. The seal 24 is collapsible as shown.

Turning to FIGS. 2–6, the truck body 12 is partially shown, and includes a midgate assembly 30 positioned in the opening 19 between adjacent compartments of the body 12. The midgate assembly 30 is secured to the frame 32 of the body, which forms the opening 19. The midgate assembly 30 includes the closure panel 34, the crossbar 36, and the window 38

The closure panel 34 occupies the lower portion 40 of the opening 19, and the window 38 occupies the upper portion 42 of the opening 19. The closure panels may be steel, aluminum, magnesium or composite. The panels could be single components, bent together with endcaps to hold them in a desired shape, or they could have structural inner members with composite inner and outer panels. The panels could include glass or talc filler for strength. The window 38 is mounted to the frame 32 in the upper portion 42 of the opening 19 to close the upper portion 42 of the opening 19. The window 38 may be permanently fixed in the upper portion 42 of the opening 19, or it may be removably attached in the upper portion 42 of the opening 19. The window 38 is supported by a channel 44 and by the crossbar 36.

The crossbar 36 may be permanently fixed in the opening 19, or may be movable with the closure panel 34 when the closure panel 34 is pivoted to an open position.

The closure panel 34 includes first and second hinged panel sections 46, 48 which are each pivotable between an open position permitting access through first and second portions 50, 52, respectively, of the lower portion 40 of the opening 19, and a closed position closing the first and second portions 50, 52, respectively, of the lower portion 40 of the opening 19.

Figure 2:
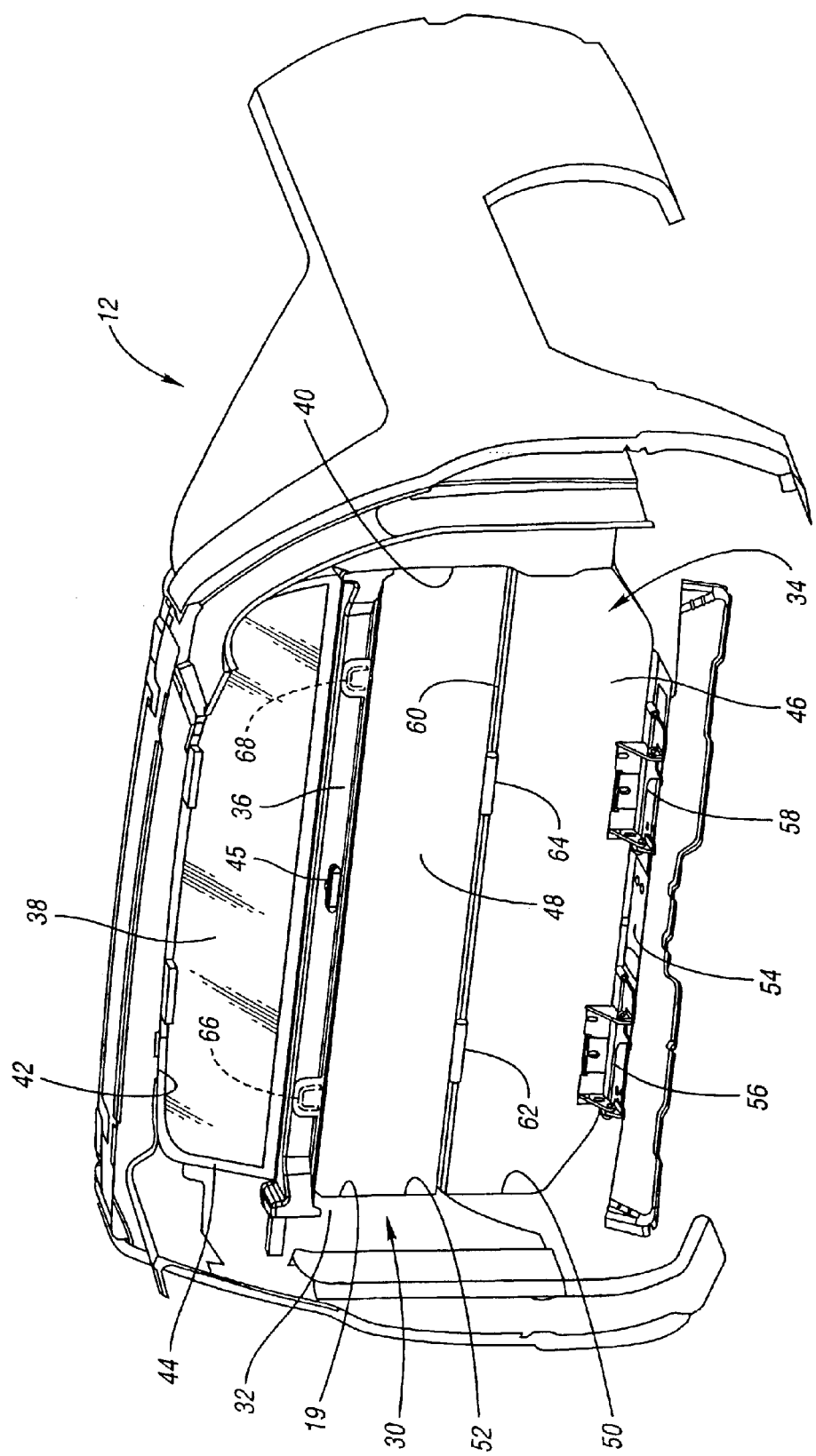
FIG. 2 shows a perspective view of a midgate assembly in a vehicle body opening in accordance with the present invention.

As shown in FIG. 2, the first hinged panel section 46 is pivotally connected to the body floor 54 (which is part of the frame 32) by the hinges 56, 58. The hinges 56, 58 define a first horizontal pivot access about which the first hinged panel section 46 pivots. The second hinged panel section 48 is positioned vertically above the first hinged panel section 46, in the configuration of FIG. 2, with a horizontal split 60 therebetween. Hinges 62, 64 pivotally connect the first and second hinged panel sections 46, 48 to form a second horizontal pivot axis. Latch and striker assemblies 66, 68 are shown in phantom in FIG. 2. The latch and striker assemblies 66, 68 are provided to secure the second hinged panel section 48 to the crossbar 36 in a releasable manner. The latch/striker assemblies 66, 68 are disengageable via the handle 45 for reconfiguring (i.e. pivoting) the hinged panel sections panel 46,48.

By way of example, latch/striker or interlock mechanisms are shown in commonly owned U.S. Pat. No. 6,513,863, which is hereby incorporated by reference in its entirely. One skilled in the art will appreciate many different types of latching structures which could be implemented with the present invention.

U.S. Pat. Nos. 5,934,727; 6,260,916; and 6,416,104 are also hereby incorporated by reference in their entirety.

Figure 3:
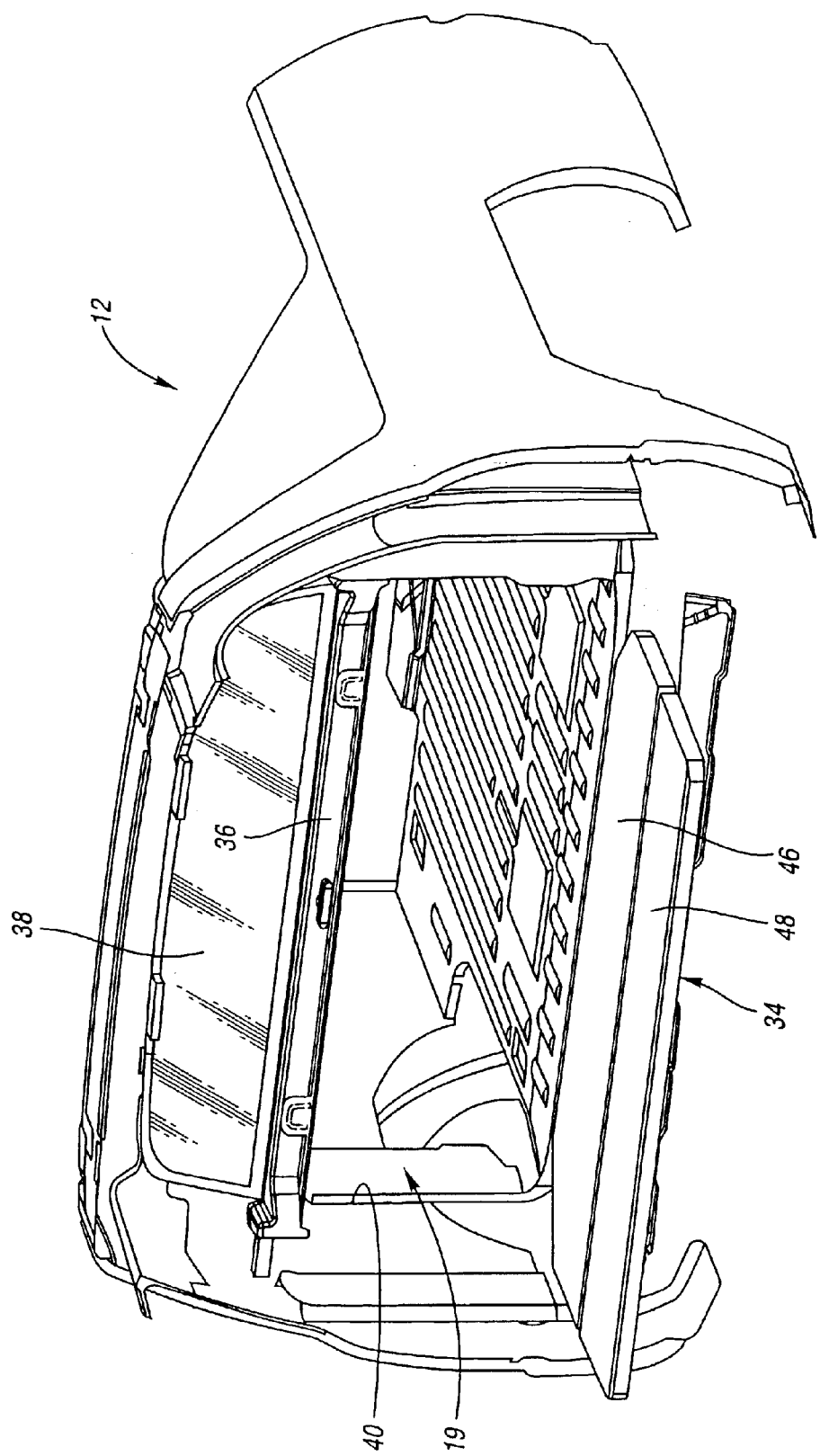
FIG. 3 shows a perspective view of the vehicle body of FIG. 2 with the closure panel in the open position.
Figure 5:
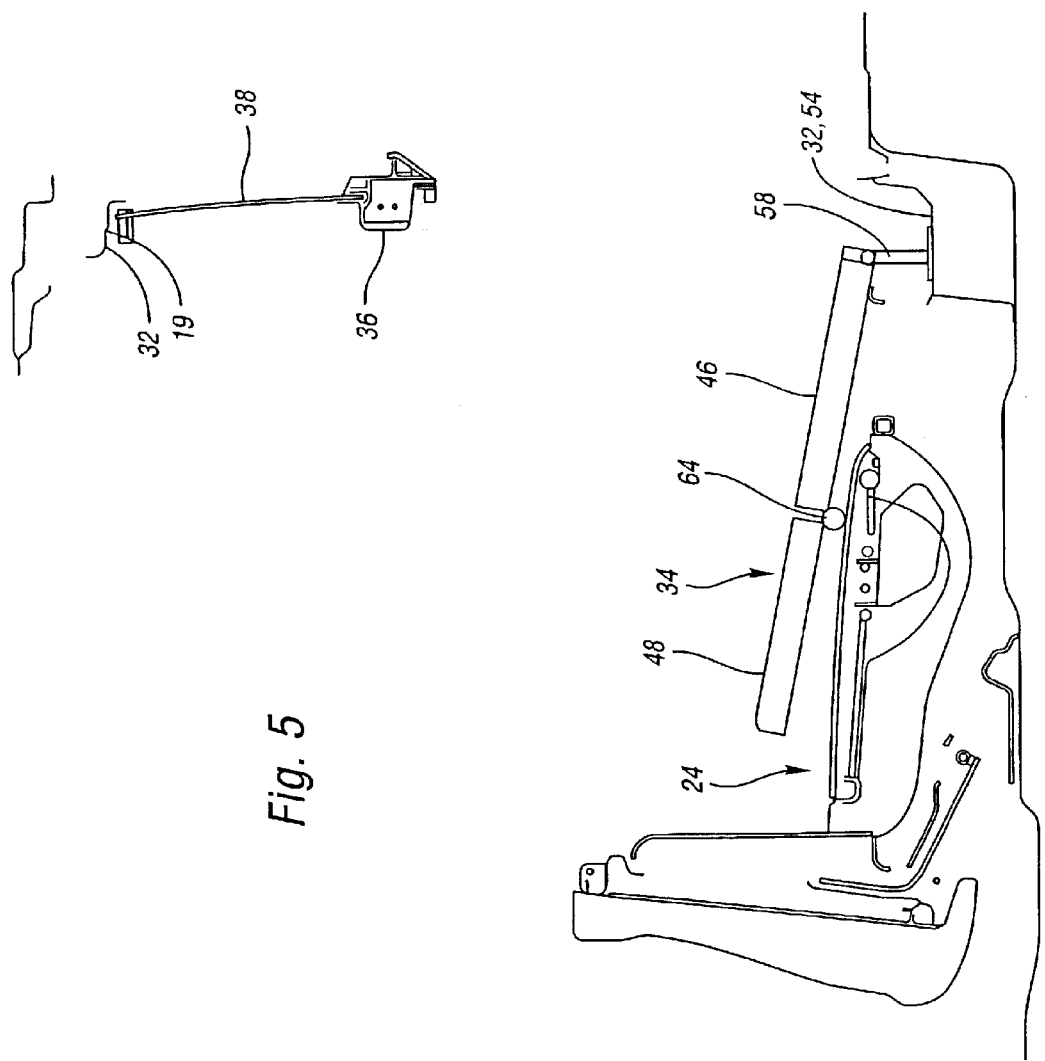
FIG. 5 shows a vertical cross sectional view of the body as shown in FIG. 4 with the closure panel pivoted to a collapsed position on top of the vehicle seat.

FIGS. 3 and 5 show the closure panel 34 in the fully open position to permit complete access through the lower portion 40 of the opening 19.

Figure 4:
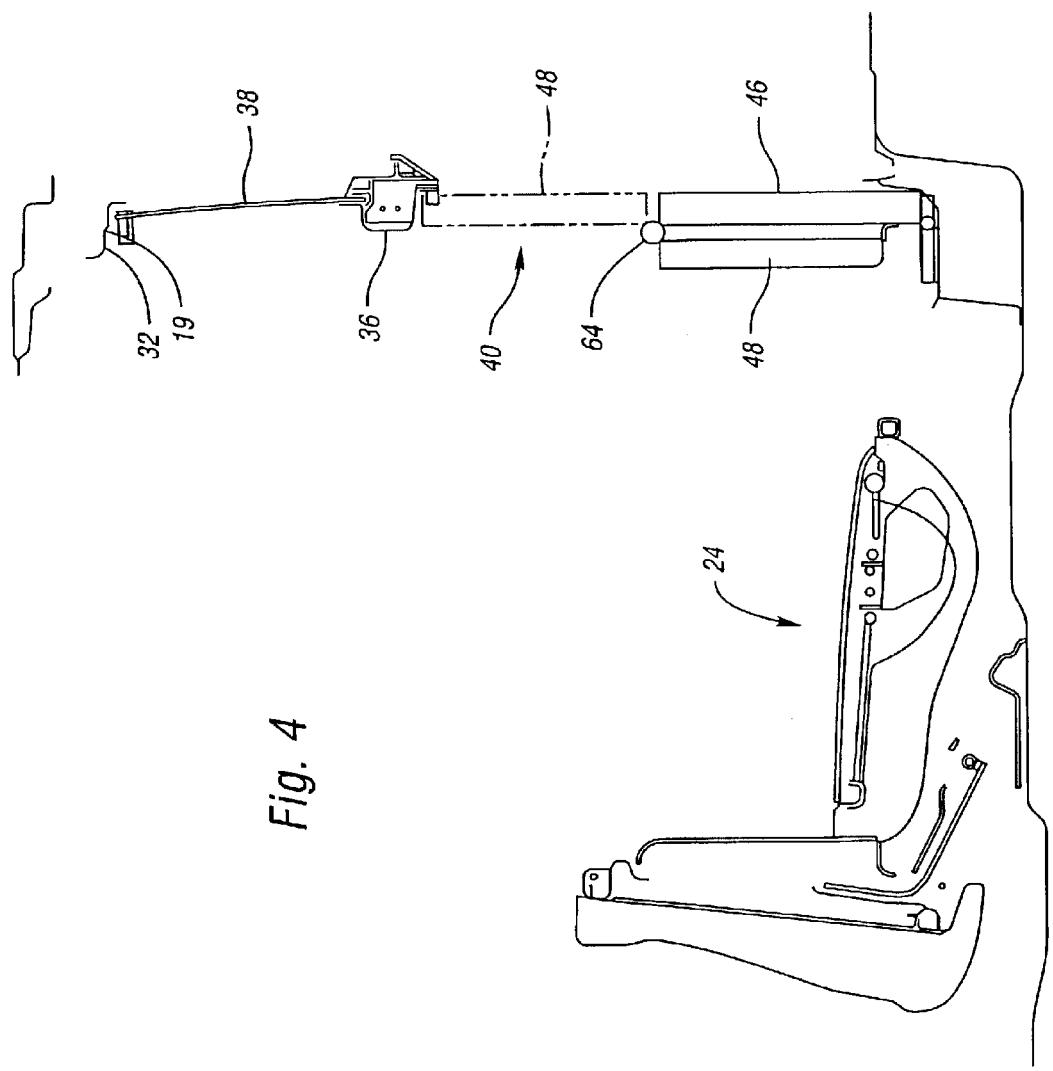
FIG. 4 shows a vertical cross sectional view of the vehicle body of FIGS. 1 and 2, including a collapsed vehicle seat.

FIG. 4 illustrates the second hinged panel section 48 in the open position to permit access through that part of the lower portion 40 of the opening 19 which had been occupied by the second hinged panel section 48. FIG. 4 shows the closed position of the second hinged panel section 48 in phantom.

FIG. 5 illustrates an open configuration of the closure panel 34 in which the crossbar 36 remains fixed in the opening 19 and supports the window 38. FIG. 6 illustrates an open configuration of the closure panel 34 wherein the crossbar 36 has been removed from the opening 19 and pivoted to the folded down position with the closure panel 34. The above referenced U.S. Pat. Nos. 6,260,916 and 6,416,104 show and describe crossbars which are removably connected in an opening for pivotal movement with a midgate panel. This description is incorporated by reference herein.

FIG. 6 also illustrates a configuration in which the window 38 is pivotally connected to the frame 32 by the hinge 70 for pivotal movement from the vertical position shown in phantom to the horizontal position for attachment to a headliner of the vehicle roof 72. The window may be pivoted forward or rearward in the vehicle. Alternatively, the window 38 may be completely removed from the upper portion of the opening 19 (shown in FIG. 1). A removable window is also described in the above referenced US Pat. No. 6,416,104, which description is incorporated herein.

Thus, referring to FIGS. 5 and 6, the panel sections 46, 48 may be moved to the open position in either a first condition wherein the crossbar 36 remains in the frame supporting the window 38 (see FIG. 5), or a second condition wherein the window is removed and the crossbar remains attached to and opens with the closure panel 34 (see FIG. 6).

Figure 7:
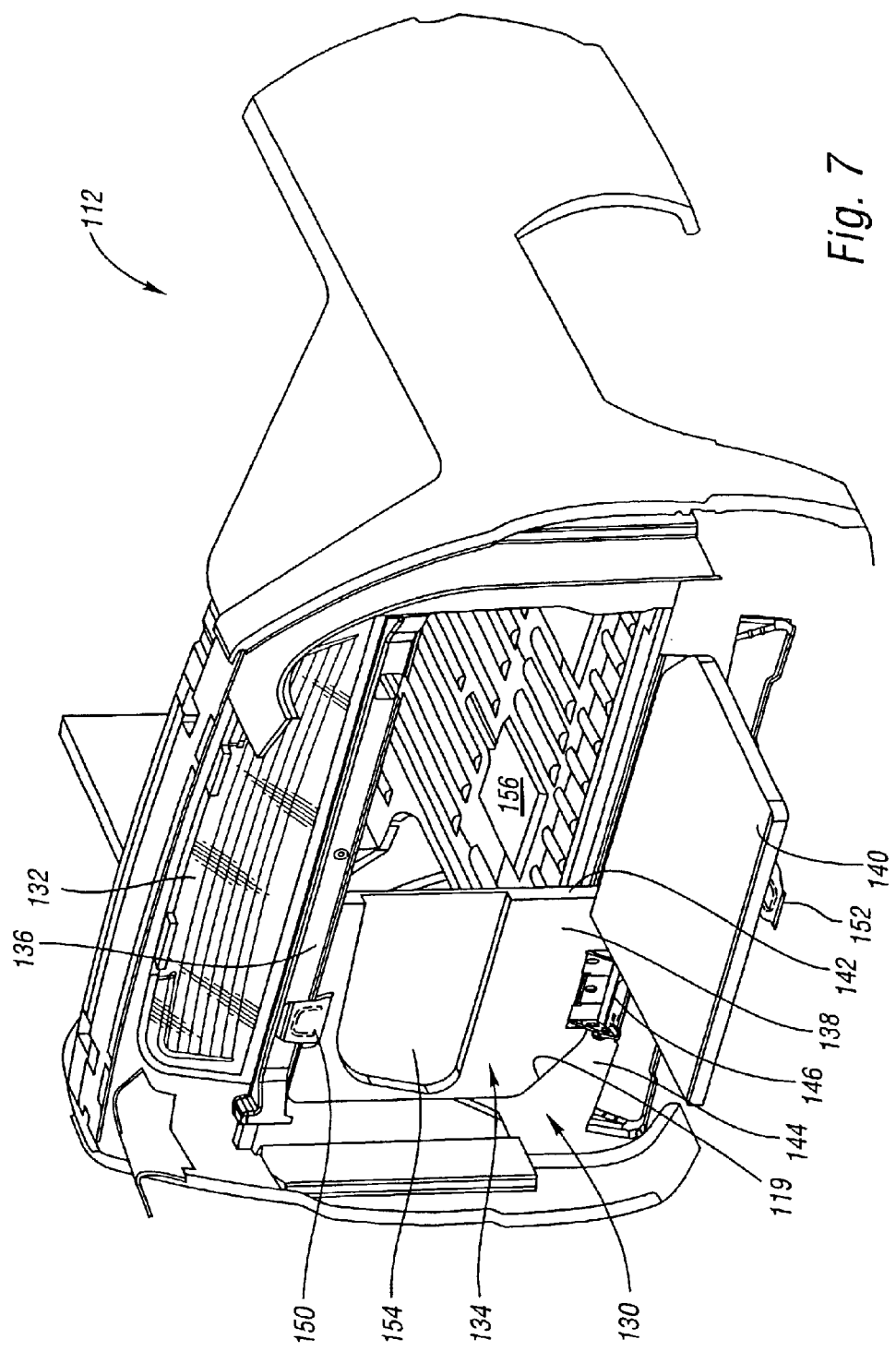
FIG. 7 shows a partial perspective view of a vehicle body in accordance with an alternative embodiment of the invention having a closure panel which is partially open.
Figure 8:
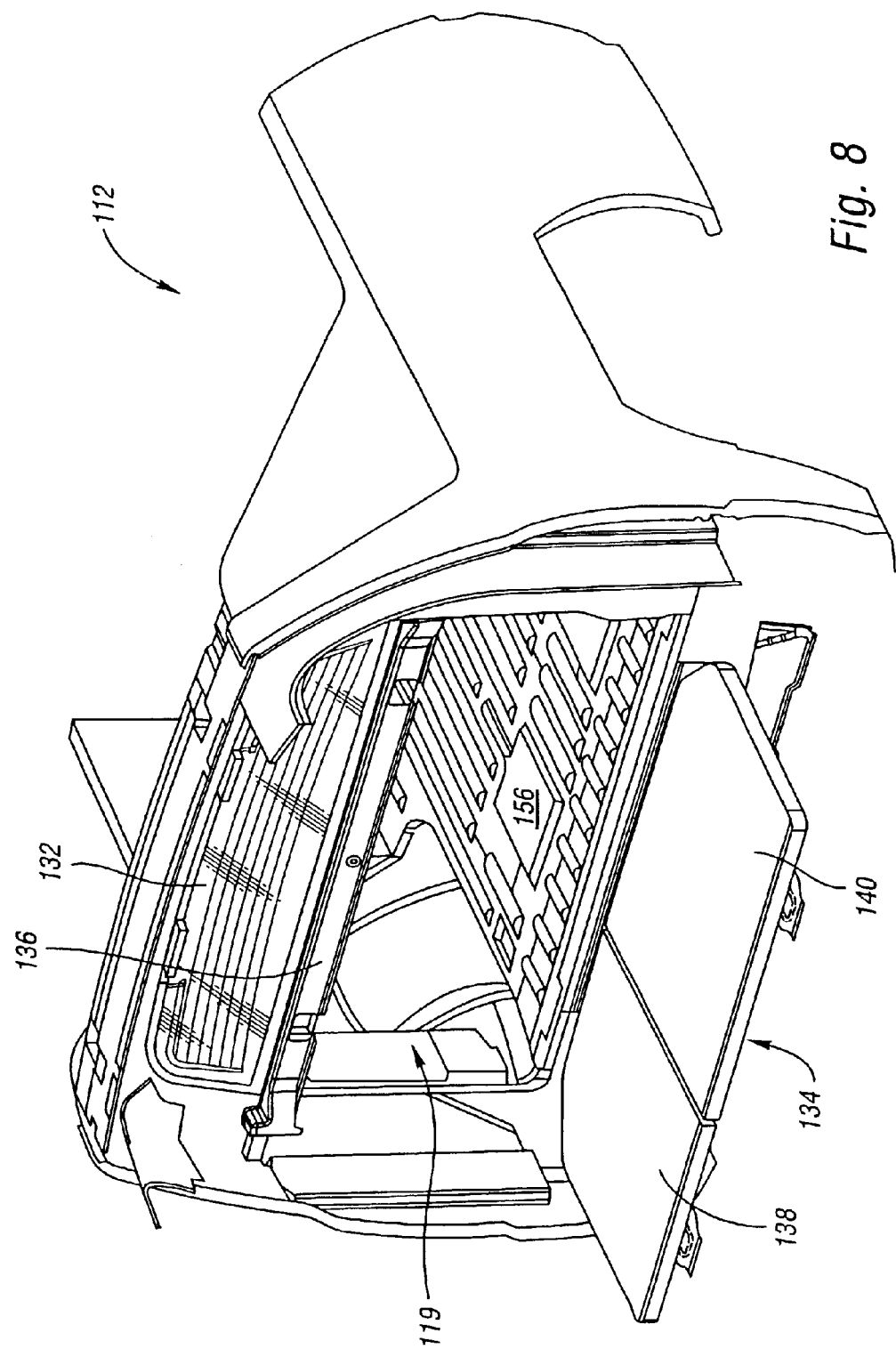
FIG. 8 shows a perspective view of the vehicle body of FIG. 7 with the closure panel in the fully open position.
Figure 9:
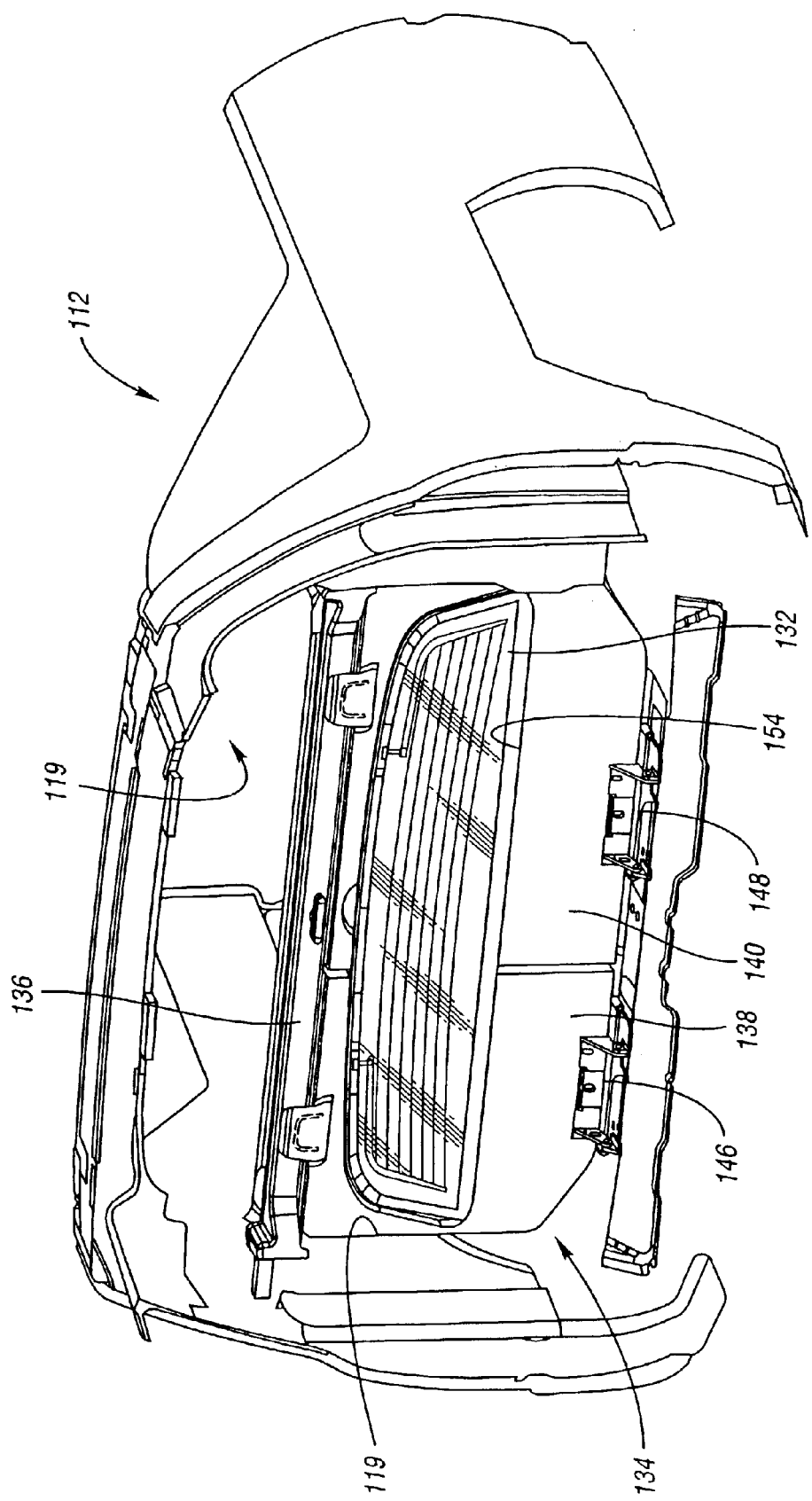
FIG. 9 shows a perspective view of the vehicle body of FIGS. 7 and 8 with the closure panel in the closed position and the window stored on the closure panel.

Turning to FIGS. 7–9, a vehicle body 112 is shown having a midgate assembly 130 positioned in an opening 119 between adjacent compartments of the body 112 in accordance with an alternative embodiment of the invention. As shown, the midgate assembly 130 includes a removable window 132, a closure panel 134, and a crossbar 136 between the closure panel 134 and window 132. The closure panel 134 includes first and second panel sections 138, 140 which are positioned side-by-side adjacent each other with a vertical split 142 therebetween. The first and second panel sections 138, 140 are each pivotally connected to the frame 144 by hinges 146, 148, most clearly shown in FIG. 9, to form a horizontal axis about which the first and second panel sections 138, 140 pivot.

The first and second panel sections 138, 140 may be independently openable, or may be interleaved along the vertical split 142 so that one of the panels may open independently, but the other panel may only open when both panels open.

Latch assemblies 150, 152 are shown in phantom in FIG. 7 for connecting the first and second panel sections 138, 140 to the crossbar 136 in the upright, closed position.

FIG. 8 shows the closure 134 in the fully open position to permit access through the lower portion of the opening 119.

As shown in FIGS. 7 and 9, the closure panel 134 also includes a recess or pocket 154 formed therein to receive the window 132 when the window 132 is removed from the opening 119. FIG. 9 shows the window 132 stored in the recess 154. In this position, the window 132 may pivot to the folded down position with the closure panel 134. In the configuration shown in FIG. 9, the upper portion of the opening 119 is open for access therethrough, and the closure panel 134 and window 132 may be pivoted down along with the crossbar 136 to permit complete access through the entire opening 119. In this configuration, longer cargo items may extend from the cargo box 156 into the passenger compartment.

Figure 10A:
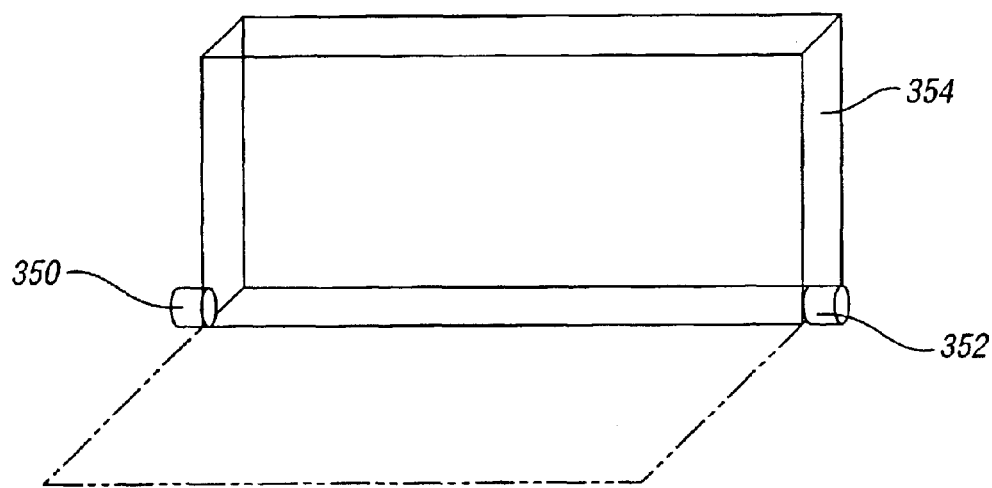
FIG. 10a shows a schematic perspective view of a midgate panel or closure panel including a drive motor for pivoting the panel.
Figure 10B:
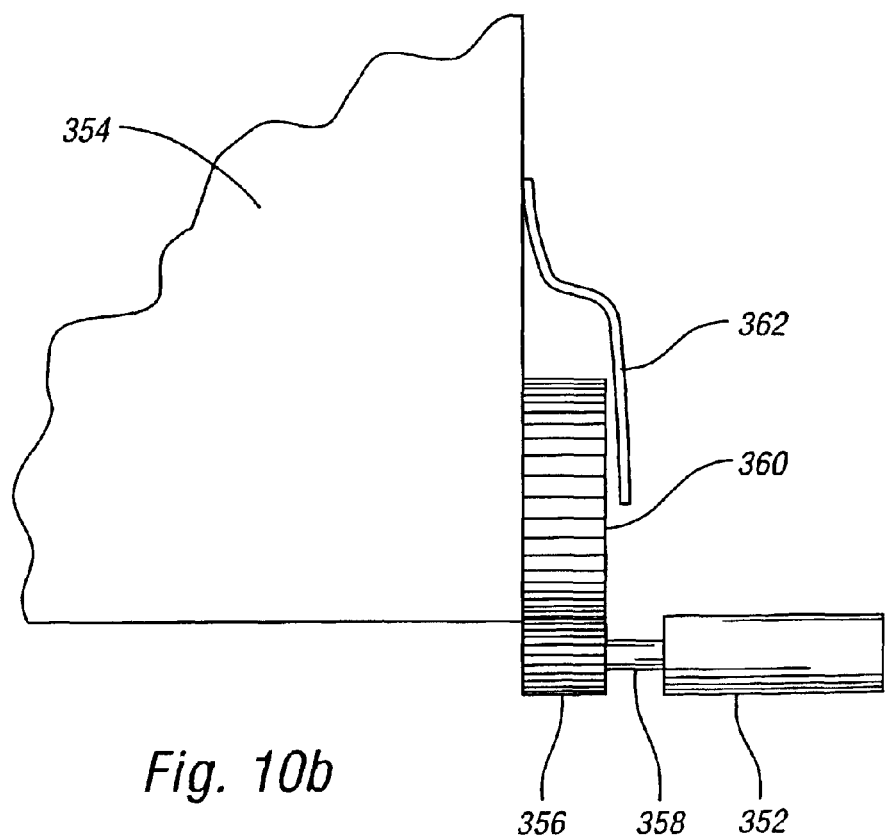

FIGS. 10a and 10b schematically illustrate the use of drive motors 350, 352 which are operative to pivot the closure panel 354 between open and closed positions, this motor may be used in the above described embodiments, such as in pivoting the closure panel 134 of FIGS. 7–9 between the open and closed positions. As shown in FIG. 10b, the motor 352 rotates a drive gear 356 through a shaft 358, and the rotation of the drive gear 356 actuates pivotal movement of the midgate panel 354 by engagement of the teeth of the drive gear 356 with the teeth of the driven gear 360. A trim piece 362 is provided to cover the driven gear 360. Of course, this configuration may be replaced with a curved rack and pinion, a cable/pulley drive system, a drive motor in the middle of the closure panel, etc. The system may be equipped with a clutch. Further, a single motor may be used as a regulator, latching motor, end gate drive motor, etc. Remote keyless entry may be implemented to signal pivotal movement of the midgate panel.

Figure 11A:
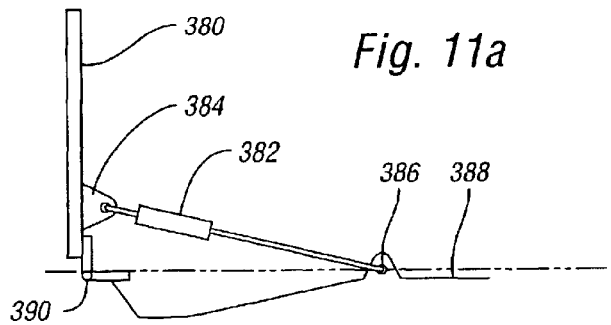
FIGS. 11a–d shows sequential side schematic illustrations of a midgate panel or closure panel and counterbalance strut in various positions between upright (11a) and collapsed (11d) positions.
Figure 11B:
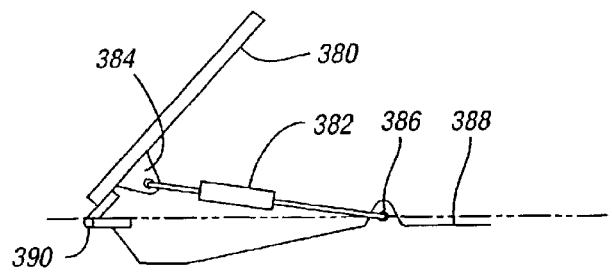
Figure 11C:
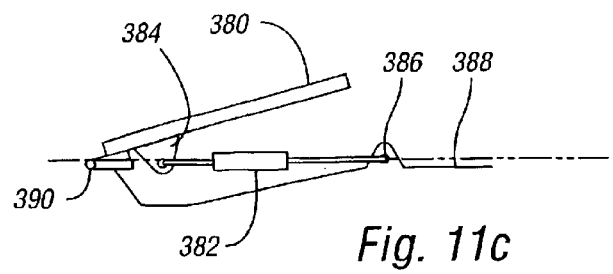
Figure 11D:
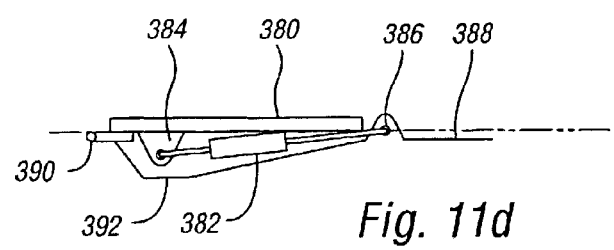

FIGS. 11a–d show sequential positions of a closure panel 380 pivoting between an upright position shown in FIG. 11a and a collapsed position shown in FIG. 11d. As illustrated, a counterbalance gas strut 382 is operatively connected between a support bracket 384 on the closure panel 380 and a floor bracket 386 extending from the body floor 388. As shown, the closure panel 380 is pivotally connected to the body floor 388 at a pivot joint 390.

In the upright position shown in FIG. 11a, the gas strut 382 is exerting a force on the closure panel 380 and the bracket 386. The gas strut is always attempting to expand, and therefore holds the closure panel 380 in the upright position. In FIG. 11b, a user is exerting a force F against the closure panel 380 to pivot the closure panel in a closing direction about the pivot joint 390. The gas strut 382 is still exerting a force on the closure panel and floor bracket 386. The force the user is exerting on the closure panel is overcoming the gas strut, causing it to compress. The gas strut is moving closer to the floor as the closure panel 380 is closing. At the position shown in FIG. 11c, the gas strut 382 is in its most compressed state and thereafter goes over-center. The gas strut 382 does not compress any more than in this position (the center position). When the closure panel 380 is pushed down even further, the gas strut begins to expand and causes the midgate panel to be pulled downward toward the floor 388. In FIG. 11d, gas strut 382 has pulled the closure panel 380 into the folded down position. The user force was not need to pull the closure panel down to its final position. In this position, the gas strut 382 serves as a damping device to prevent the closure panel 380 from popping up when the vehicle goes over bumps and swells. As shown, the recess 392 in the body floor 388 allows the gas strut 382 and bracket 384 to extend below the plane of the body floor 388 for compact storage. The gas strut 382 may be replaced by a compression spring or the like. The performance criteria of the gas strut would depend upon the mass of the midgate (closure) panel, and must provide a sufficient assist force for closing and a sufficient holding force to prevent bouncing of the midgate in the open position.

The above described gas strut 382 may be used with the closure panels 34, 134 described previously with reference to FIGS. 2–9.

Figure 12:
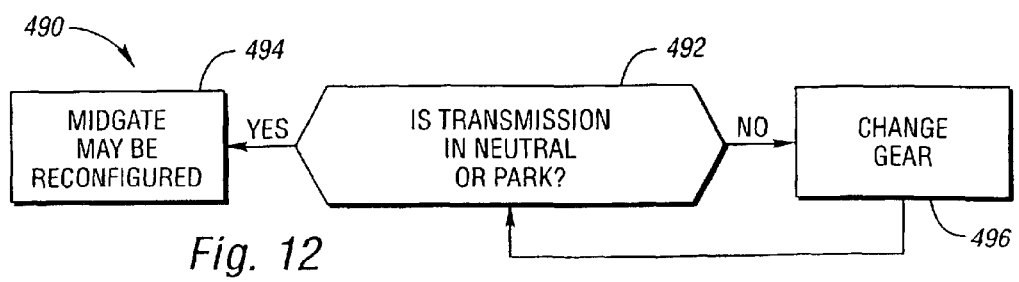
FIG. 12 shows a schematic illustration of a blockout control for controlling movement of a midgate or closure panel based upon the condition of a corresponding transmission.

FIG. 12 schematically illustrates a blockout control which prevents closure panel adjustment unless a corresponding vehicle transmission is in neutral or park. At the decision block 492, a decision is made whether the transmission is in neutral or park. If the transmission is in neutral or park, the closure panel may be adjusted electrically or mechanically (block 494). If the transmission is not in neutral or park, then the closure panel would be disabled until the transmission gearing is changed to neutral or park (block 496). This disabling would occur by simply disabling unlatching of the latch/striker mechanism which holds the closure panel in the upright, closed position. An electrical circuit would provide an appropriate input to a body control module to enable unlatching only when the vehicle is in park or neutral.

Each of the features of the invention described previously may be combined with any other features shown and described herein. While the best modes for carrying out the invention have been described in detail, those familiar with the art to which this invention relates will recognize various alternative designs and embodiments for practicing the invention within the scope of the appended claims.

What is claimed is:

1. A vehicle body having a first compartment for carrying passengers or cargo and a second compartment for carrying cargo rearwardly adjacent the first compartment, the body comprising:

a frame defining an opening between the first and second compartments, the opening including lower and upper portions;

a window mounted to the frame to close the upper portion of the opening; and a closure panel mounted to the frame and having first and second hinged panel sections each pivotable between an open position permitting access through first and second portions, respectively, of said lower portion of the opening, and a closed position closing said first and second portions, respectively, of said lower portion of the opening.

2. The vehicle body of claim 1, wherein said first and second panel sections are positioned side-by-side adjacent each other with a vertical split therebetween, and said first and second panel sections are each pivotably connected to the frame about a horizontal axis at a lower edge of said lower portion of the opening.

3. The vehicle body of claim 1, wherein said second hinged panel section is positioned vertically above the first hinged panel section with a horizontal split therebetween, said first hinged panel section being pivotally connected to the frame about a first horizontal pivot axis and said first hinged panel section being pivotally connected to the second hinged panel section about a second horizontal pivot axis.

4. The vehicle body of claim 1, further comprising a crossbar mounted in the opening between the upper and lower portions.

5. The vehicle body of claim 4, wherein the crossbar is fixed to the frame.

6. The vehicle body of claim 4, wherein the crossbar is removably mounted to the frame and pivotable with the closure panel to the open position.

7. The vehicle body of claim 4, wherein said window is removable and wherein said panel sections may be moved to the open position in either a first condition wherein the crossbar remains in the frame supporting the window, or a second condition wherein the window is removed and the crossbar remains attached to and opens with the panel sections.

8. The vehicle body of claim 1, wherein said window is hinged to the frame.

9. The vehicle body of claim 2, further comprising a counterbalancing strut operatively connected between one of the panel sections and a body floor to bias said one of the panel sections toward the open and closed positions, alternatively, depending upon the pivoted position of said one of the panel sections.

10. The vehicle body of claim 9, wherein said counterbalancing strut comprises a gas strut which is pivotable between a first position biasing said one of the panel sections toward the closed position and a second position biasing said one of the panel sections toward the open position, with a center position therebetween at which the gas strut is at its most compressed position, and said gas strut is at least partially positionable within a floor recess when in said second position.

11. The vehicle body of claim 1, further comprising an electric motor operatively connected to at least one of the panel sections for pivoting said at least one of the panel sections between the open and closed positions.

12. The vehicle body of claim 1, wherein said closure panel forms an pocket for receiving the window when the window is removed from the upper portion of the opening.

13. The vehicle body of claim 1, further comprising a latch for holding the closure panel in the closed position and a control for allowing unlatching of said latch only when a corresponding vehicle transmission is in a park or neutral condition.

14. A midgate assembly for use in a vehicle body having an opening between adjacent compartments, the opening including lower and upper portions, the midgate assembly comprising:
  a window mounted to the vehicle body to close the upper portion of the opening; and
  a closure panel mounted to the vehicle body and having first and second hinged panel sections each pivotable between an open position permitting access through first and second portions, respectively, of said lower portion of the opening, and a closed position closing said first and second portions, respectively, of said lower portion of the opening.

15. The midgate assembly of claim 14, wherein said first and second panel sections are positioned side-by-side adjacent each other with a vertical split therebetween, and said first and second panel sections are each pivotally connectable in the opening about a horizontal axis at a lower edge of said lower portion of the opening.

16. The midgate assembly of claim 14, wherein said second hinged panel section is positioned vertically above the first hinged section with a horizontal split therebetween, said first hinged panel section being pivotally connected to the vehicle body about a first horizontal pivot axis and said first hinged panel section being pivotally connected to the second hinged panel section about a second horizontal pivot axis.

17. The midgate assembly of claim 14, further comprising a crossbar mounted between the window and the closure panel.

18. The midgate assembly of claim 15, further comprising a counterbalancing strut operatively connectable between one of the panel sections and a body floor to bias said one of the panel sections toward the open and closed positions, alternatively, depending upon the pivoted position of said one of the panel sections.

19. The midgate assembly of claim 14, further comprising an electric motor operatively connectable to at least one of the panel sections for pivoting said at least one of the panel sections between the open and closed positions.

20. The midgate assembly of claim 14, wherein said closure panel forms a pocket for receiving the window when the window is removed from the upper portion of the opening.

21. A vehicle body having a first compartment for carrying passengers or cargo and a second compartment for carrying cargo rearwardly adjacent the first compartment, the body comprising:
  a frame defining an opening between the first and second compartments, the opening including lower and upper portions;
  a window mounted to the frame to close the upper portion of the opening;
  a closure panel mounted to the frame and including first and second hinged panel sections each pivotable between an open position permitting access through first and second portions, respectively, of said lower portion of the opening, and a closed position closing said first and second portions, respectively, of said lower portion of the opening;
  wherein said second hinged panel section is positioned vertically above the first hinged panel section with a horizontal split therebetween, said first hinged panel section being pivotally connected to the frame about a first horizontal pivot axis and said first hinged panel section being pivotally connected to the second hinged panel section about a second horizontal pivot axis; and
  a crossbar mounted in the opening between the upper and lower portions, wherein the crossbar is removably mounted to the frame and pivotable with the closure panel to the open position.

22. The vehicle body of claim 21, wherein said closure panel forms a pocket for receiving the window when the window is removed from the upper portion of the opening.

* * * * *